Aug. 2, 1966 K. G. KING 3,264,548
D.C. TO A.C. INVERTER CIRCUITS
Filed April 12, 1962 2 Sheets-Sheet 1

(a)

(b)

(a)

(b)

United States Patent Office 3,264,548
Patented August 2, 1966

3,264,548
D.C. TO A.C. INVERTER CIRCUITS
Kenneth G. King, London, England, assignor to Westinghouse Brake and Signal Company, Limited, London, England
Filed Apr. 12, 1962, Ser. No. 186,978
Claims priority, application Great Britain, Apr. 18, 1961, 13,897/61
5 Claims. (Cl. 321—45)

This invention relates to inverter circuits and relates especially to inverter circuits which employ transformer devices having saturable cores and relying on the action of a storage capacitor to achieve commutation.

According to the present invention there is provided an inverter circuit arrangement the output current of which is derived via a transformer and wherein the commutation frequency of the inverter is predetermined to be higher on switching on than under normal running conditions to reduce the possibility of saturation of the transformer on switching on.

In one form of D.C. to A.C. inverter, commutation of current to an output transformer is dependent at least partially upon the voltage on a storage capacitor and by virtue of the invention saturation of the transformer on switching on may be prevented to reduce the possibility of the commutation being prevented by the low impedance presented by a saturated transformer to the storage capacitor.

Figure 1:
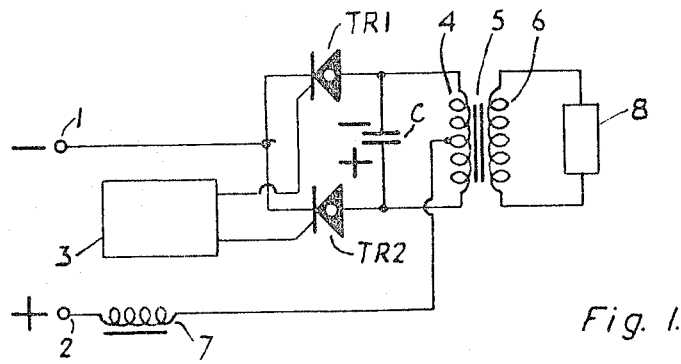
Figure 2:
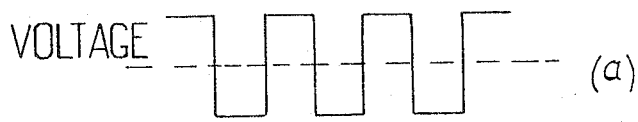
Figure 2:
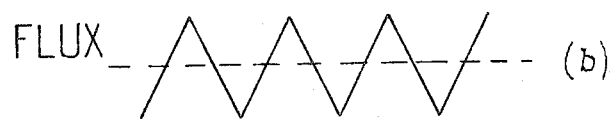
Figure 3:
Figure 4:
Figure 4:
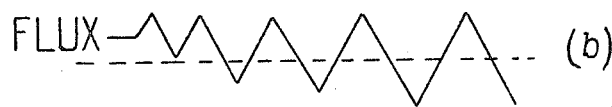
Figure 5:
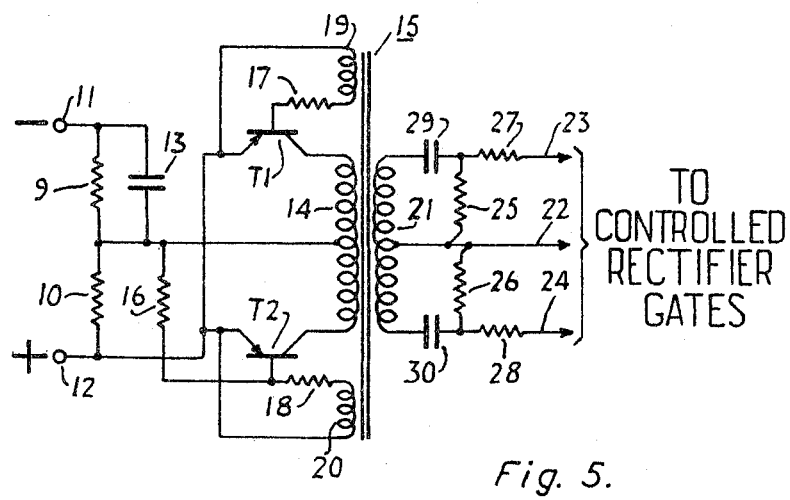
Figure 6:
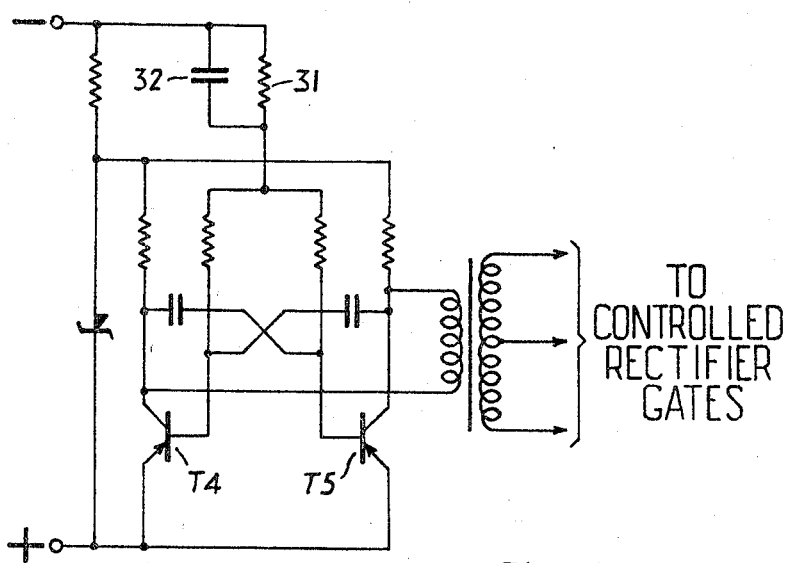

In order that the invention may be clearly understood and readily carried into effect, the invention will be further described hereafter having reference to the accompanying drawings, of which, FIGURE 1 illustrates one form of inverter circuit to which the invention may be applied, FIGURES 2, 3 and 4 illustrate voltage and flux waveforms to be referred to and FIGURES 5 and 6 illustrate examples of trigger pulse source arrangements suitable for carrying the invention into effect.

Referring to FIGURE 1, a D.C. supply source not shown is connected to the negative input terminal 1 and the positive input terminal 2 as indicated, terminal 1 being connected to the negative terminals of a pair of controllable rectifier devices TR1 and TR2.

TR1 and TR2 in the present example are assumed to be semiconductor rectifier switching devices of a well known form which are rendered conducting on application of triggering pulses from a trigger pulse source 3 but which are subsequently only rendered non-conducting again by removal of the applied voltage. The source 3 provides triggering pulses alternately to the rectifier devices. The positive terminals of these devices are connected to the terminals of a primary winding 4, of a transformer 5, a centre tapping of 4 being connected via a ballast choke 7 to the terminal 2. The secondary winding, 6 of 5 is connected to a load 8 to be supplied with alternating current from the inverter and a storage capacitor C is connected between the positive terminals of TR1 and TR2 as shown.

In operation of the arrangement of FIGURE 1, let it be assumed that TR1 has been rendered conducting by a triggering pulse from 3. Current flows from 2 via 7, the upper half of 4, through TR1 and back to 1. The capacitor C becomes charged with a polarity as indicated. When TR2 is now rendered conducting by the reset trigger pulse from 3, the charge on C is applied to TR1 in reverse and thereby renders it non-conducting. When TR1 is subsequently rendered conducting again by a further triggering pulse from 3, TR2 is rendered nonconducting by the reverse voltage developed on C and so on. The output voltage appied to the load is therefore reversed by the commutation effect of TR1 and TR2.

The ideal output voltage waveform for the inverter is shown in FIGURE 1 at (a) and the ideal flux waveform for the transformer 5 is shown in FIGURE 1 at (b). It will be understood however that due to circuit imperfections the waveforms produced in practice may differ somewhat from the ideal. When the inverter is first switched on moreover, the initial flux in the transformer 5 is indeterminate and in general is such that the waveform shown at (b) in FIGURE 1 is not immediately established. Assuming for example that the core of 4 is initially completely demagnetized and assuming also that saturation is not produced, the flux waveform produced on switching on the inverter may be as shown in FIGURE 3. The flux rises to almost twice the normal operating flux magnitude in the first half cycle after switching on and subsequently settles down to the normal condition. If the core of 4 is initially magnetized in the wrong direction, the rise of flux in the first half cycle after switching on is even greater than that shown in FIGURE 3. With a transformer designed for normal operating conditions the waveform shown in FIGURE 3 may not in fact be produced as saturation of the core on 4 may occur, thereby presenting a low impedance to the capacitor C via the primary winding 4. This enables C to discharge in the commutation interval and therefore C cannot apply the desired reverse voltage to render non-conducting whichever of TR1 or TR2 is first rendered conducting, to start the commutation process. The inverter therefore fails to commence operation.

To overcome the above difficulty it is possible to design the transformer 5 to run with a low flux density but to achieve this, 5 has to be much larger than would otherwise be necessary for normal operation. If as according to the invention the frequency of operation on switching on is arranged to be substantially higher than the normal operating frequency, the size of the transformer 5 may not require to be larger than is necessary for normal operation. This is possible because the flux density in the transformer is reduced when the operating frequency of the transformer is increased.

Referring to FIGURE 5, this figure illustrates one example of a trigger pulse source suitable for use with an inverter circuit as shown in FIGURE 1 for the purposes of the invention. A potential divider comprising resistors 9 and 10 is connected between D.C. supply terminals 11 and 12, the resistor 9 having a capacitor 13 connected across it. The D.C. supply, 9, 10 and 13 constitute a variable voltage supply circuit. The terminal 12 is connected in common to the emitter electrodes of a pair of transistors T1 and T2, the collector electrodes of which are connected to opposite terminals of a transformer winding 14 of a transformer 15. 14 has a centre-tapping which is connected to the junction of 9 and 10 and also via a resistor 16 to the base electrode of T2. The base electrode of T1 and T2 are connected via respective resistors 17 and 18 and respective windings 19 and 20 to a common emitter connection as shown. A further transformer winding, 21 is provided on 15, to act as the output winding. The latter is centre-tapped to a common output lead 22 and the terminals of 21 are connected via differentiating circuits, made up of respective resistors 25 and 26, 27 and 28 and capacitors 29 and 30 to the output leads 23 and 24.

In operation of the circuit of FIGURE 5, on switching on the D.C. supply to 11 and 12, the full D.C. voltage is initially applied across the resistor 10, owing to the action of the capacitor 13 and depending upon the time constant of the circuit made up of 9, 10 and 13, the voltage across 10 is therefore variable and gradually falls to that detemined by 9 and 10, the time taken for this to occur depending upon the time constant of 9 and 13. Thus the transistors begin to conduct alternately by virtue of the sense of the windings 19 and 20 relative to that of 14 with a frequency which reduces from a maximum value on switching on, to a normal operating value when the potential across 10 has settled down to the above mentioned value determined by 9 and 10. The voltages appearing across the upper and lower halves of 21 are therefore square waves and these square waves are differentiated by the aforementioned differentiating circuits to produce the desired triggering pulses in leads 23 and 24. The trigger pulses are therefore of a relatively high frequency on switching on and subsequently fall to the normal operating frequency for the inverter.

Referring to FIGURE 6, this figure illustrates a further trigger pulse source suitable for use with an inverter circuit as shown in FIGURE 1 for the purposes of the invention. This circuit will not be described in detail but it will be apparent that it comprises basically a multivibrator of well known form, comprising a pair of cross-coupled transistors T4 and T5 the emitter electrodes of which are connected to the positive D.C. source terminal and the base electrodes of which are coupled via a parallel arrangement of a resistor 31 and a capacitor 32 to the negative D.C. source terminal. In this case, the D.C. source, 31 and 32 form the variable voltage supply. On switching on, the potential applied to the base electrode circuits of T4 and T5 is not independent of the resistor 31 owing to the shunt effect of capacitor 32, therefore the multivibrator starts with a relatively high frequency which reduces in a time determined by 31 and 32 to a normal operating rate for the inverter switching devices. The output from the trigger circuit is derived via a transformer the primary of which is connected to the collector electrodes of T4 and T5 as shown.

When either of the above circuit arrangements are employed in conjunction with the circuit arrangement of FIGURE 1, the flux in the transformer 5 is relatively small on switching the inverter on, subsequently rising to the normal operating value. The flux waveform on switching on is illustrated in FIGURE 4. From this it will be clear that the time constant of the circuits associated with the capacitor 13 or the capacitor 32 as the case may be, should be selected to enable a few cycles of commutation to occur before the normal flux is attained.

Although two specific forms of trigger pulse generating circuit are described herein, the invention is not limited to either of these circuits as any suitable arrangement of an inverter in which the starting frequency is made higher than the normal operating frequency in accordance with the invention may be used.

Thus the invention may in general be applied to any form of inverter circuit in which it is desired to prevent the saturation of a transformer device on switching on. For example such circuits may include bridge circuits not including a transformer of the type illustrated in the drawings but which is coupled to a load including the type of transformer device known as a saturable reactor. Again the circuit may be of a form not including a commutating capacitor. Furthermore the invention also extends to polyphase versions of such inverter circuits.

Having thus described my invention what I claim is:

1. An inverter circuit arrangement comprising an input terminal and a terminal of an output transformer, a first switching device via which said input terminal is intermittently connectable to the terminal of the output transformer, a capacitor which is chargeable via said switching device from said input terminal, a further switching device which when rendered conducting connects said capacitor across said first switching device to render the latter non-conducting, a driver circuit for said switching devices operable to render them conducting in turn, said driver circuit having an input terminal connected via a delay circuit such that when the operating supply is applied thereto, the voltage effective to control the frequency of operation of the driver circuit is such as to cause the starting frequency to be greater than when normal operation is established.

2. An inverter circuit arrangement as claimed in claim 1 wherein said switching devices comprise controllable rectifiers connected to said driver circuit and rendered conductive on the application thereto of a triggering pulse from said driver circuit.

3. An inverter circuit arrangement as claimed in claim 2 wherein said driver circuit comprises a pair of transistors having collector emitter circuits, a transformer having a winding connected to a variable voltage supply source via said collector emitter circuits, and a secondary winding, a differentiating circuit coupled to said secondary winding, whereby the regenerative feedback from said transformer renders said transistors conductive alternately to produce output pulses in said differentiating circuit.

4. An inverter circuit arrangement as claimed in claim 3 wherein said variable voltage source comprises a potential divider connected across a reference voltage source and having one arm, and a capacitor connected across said one arm, said capacitor having such a value that the entire reference voltage is supplied to said transistors upon switching on said voltage with said voltage descending to a value dependent upon said potential divider in a time responsive to the time constant of said one arm and said capacitor.

5. An inverter arrangement as claimed in claim 2 wherein said triggering pulse source comprises a time constant circuit and a transistor multivibrator connected to said circuit with the voltages supplied to the control electrodes of said transistors being dependent on said time constant circuit so as to have a greater magnitude on switching on than after normal running conditions are established.

References Cited by the Examiner

UNITED STATES PATENTS 2,937,290   5/1960   Chen _____ 307—88.5

OTHER REFERENCES

G.E. "Controlled Rectifier Manual," copyright March 21, 1960, (pp. 56–67 and pp. 130–132).

JOHN F. COUCH, *Primary Examiner.*

LLOYD McCOLLUM, *Examiner.*

A. J. GAJARSA, M. WACHTELL, *Assistant Examiners.*